May 14, 1929.  S. J. LONERGAN  1,712,925
APPARATUS FOR POSITIONING PARTS ON BODIES
Filed May 28, 1926  5 Sheets-Sheet 1
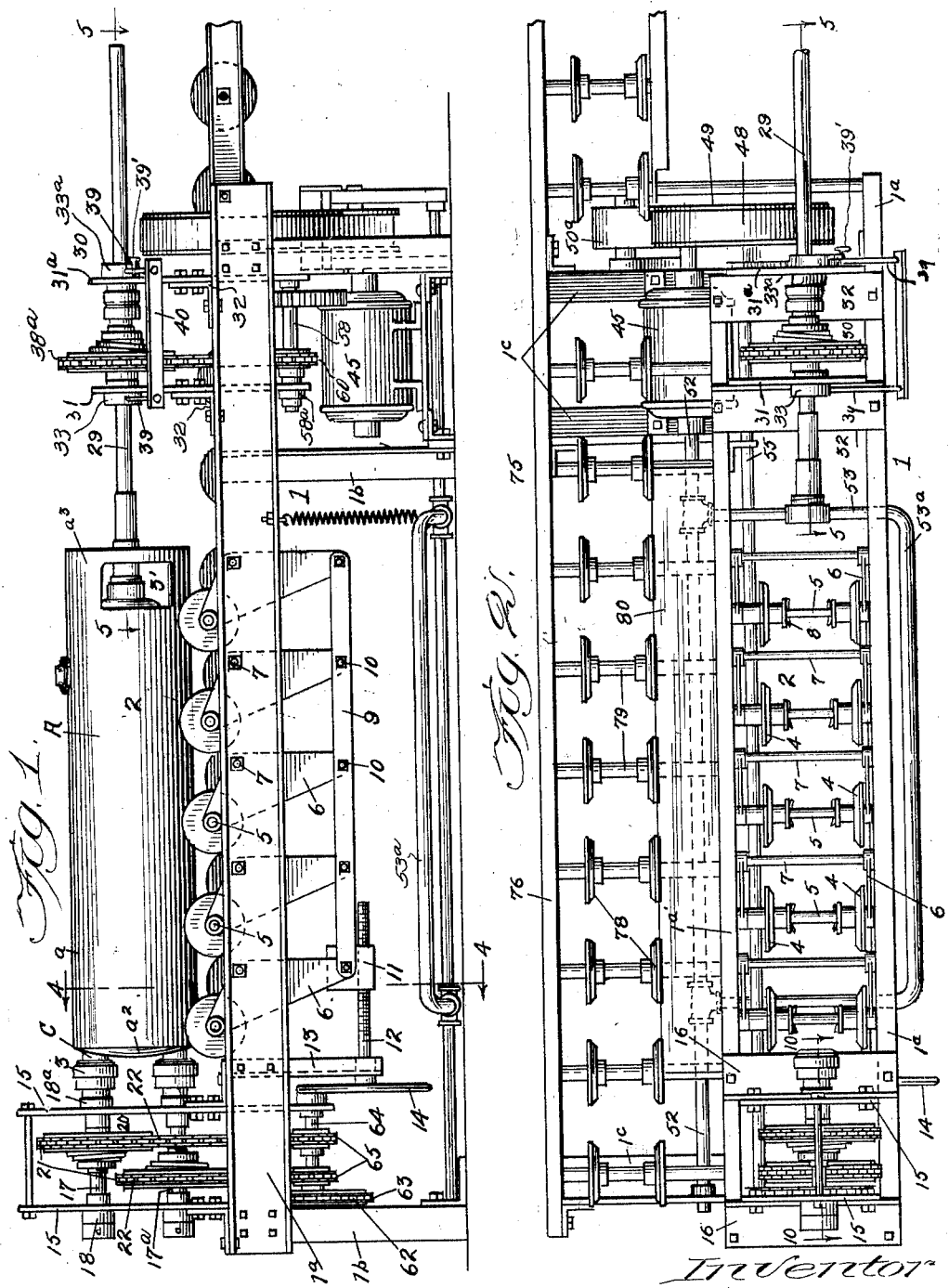

May 14, 1929.   S. J. LONERGAN   1,712,925
APPARATUS FOR POSITIONING PARTS ON BODIES
Filed May 28, 1926   5 Sheets-Sheet 2

Inventor
Simon J. Lonergan
by Geo. R. Pitts
Atty

Patented May 14, 1929.

1,712,925

UNITED STATES PATENT OFFICE.

SIMON J. LONERGAN, OF LA PORTE, INDIANA, ASSIGNOR TO BASTIAN-MORLEY CO., OF LA PORTE, INDIANA, A CORPORATION OF INDIANA.

APPARATUS FOR POSITIONING PARTS ON BODIES.

Application filed May 28, 1926. Serial No. 112,416.

This invention relates to apparatus for applying devices to walls of bodies, more particularly where the devices have screw threaded connection with such walls. In one application of the invention, I have applied it for use in threading bodies into final position in openings formed in the walls of containers or in bushings or bung rings which have been previously mounted or secured therein.

One object of the invention is to provide an improved apparatus of this character which is relatively simple in construction and readily operated.

Another object of the invention is to construct an apparatus capable of positioning in a wall one device or a plurality of devices simultaneously in a ready and rapid manner, whereby a relatively large saving of time and labor results.

Another object of the invention is to provide an improved apparatus of this character capable of positioning a plurality of devices on a wall without changing or moving the latter.

A further object of the invention is to provide an improved apparatus of this character capable of positioning devices on different walls of a container in a ready manner.

Other objects of the invention will be apparent to those skilled in the art to which my invention relates from the following description taken in connection with the accompanying drawings, wherein Fig. 1 is a side view of an apparatus embodying my invention.

Fig. 2 is a plan view thereof.

Fig. 4 is a section on the line 4—4 of Fig. 1.

Fig. 5 is a fragmentary view, partly in section on line 5—5 of Figs. 1 and 2.

Fig. 6 is a section on the line 6—6 of Fig. 5.

Figure 3:
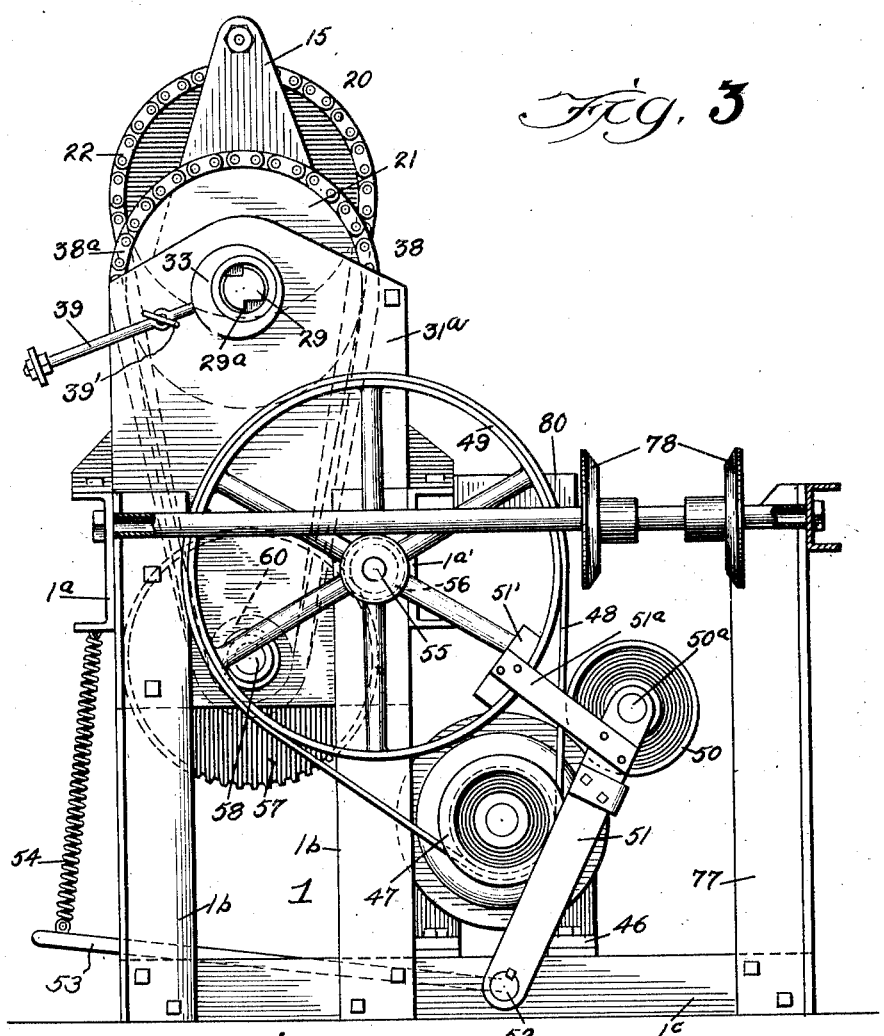
Fig. 3 is an end view.
Figure 7:
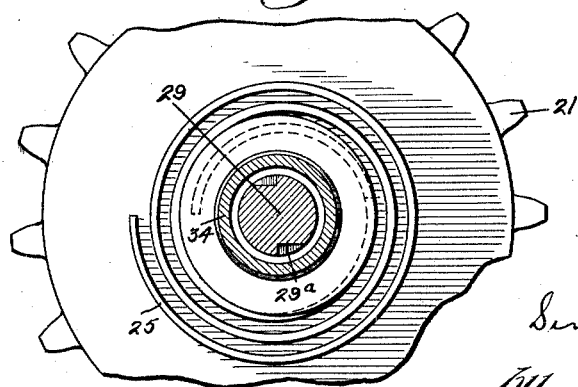
Fig. 7 is a section on the line 7—7 of Fig. 5.

In the drawings, 1 indicates a frame or suitable support preferably comprising a pair of channel members $1^a$, $1^{a'}$ supported in spaced relation by uprights $1^b$. 2 indicates as an entirety a bed on which the body such as a container for fluid is supported while the devices or bodies to be later referred to are being positioned in or upon the wall or walls thereof.

The bed 2 is adjustable vertically so that the apparatus may be readily adapted to different sized containers. The container chosen herein for illustrative purposes comprises a hot water boiler A for domestic use having an annular side wall $a$, a lower end wall or bottom $a'$ (Fig. 5) and an upper end or top wall $a^2$; the annular wall $a$ being preferably extended to form a skirt $a^3$, which—as is customary in some types of boilers—encloses the burner that heats the water therein. The bottom wall $a'$ is formed with an opening $b$ (preferably disposed axially of the boiler A) and the upper wall $a^2$ is formed with openings $c$, $c'$, either or both of which may be disposed eccentrically of the boiler axis. Both end walls are formed with aligned openings $d$, (one being shown in Fig. 6) through which extends a vent pipe B leading from the combustion space within the skirt $a^3$ to carry off the products of combustion therein. C, C', indicate bushings or bung rings suitably mounted and secured in the openings $c$, $b$, and each having one wall (preferably its inner wall) threaded to receive a threaded device, element or fitting (indicated at D, D'), whereby pipes or other devices may be connected to the boiler end walls $a^2$, $a'$, respectively. Each of these elements is provided with an irregular shaped portion E arranged to fit within and engage the walls of a driven socket member, indicated as an entirety at 3 or 3', whereby the device or element may be rotated to effect its positioning or tightening in the adjacent bushing C, C', as will later be described.

While my improved apparatus may be operated to position one or more devices or elements on or in one end wall only of the container A, I have provided for the positioning of devices or elements in the opposite end walls thereof, thereby increasing the speed of operation and reducing the labor required, to the end that large capacity of the apparatus results per unit of time.

In illustrating the preferred application of my invention I show the positioning in the bottom $a'$ of a heating element—designated D' in the drawing—having chambers through which the water circulates and a riser $D^x$ which extends inwardly toward the top wall $a^2$, and two pipe coupling elements—designated D—in the top wall $a^2$.

Due to the fact that the bodies or containers A are round, the bed 2 preferably comprises two rows of rollers or disks 4, this form of construction serving to keep each boiler A or the fitting element C, C', therein in alignment with the socket members 3, 3', and also facilitating the endwise movement of the boiler into operative relation to or between the socket members. The rolls or disks 4 are loosely mounted on shafts 5 supported at their opposite ends by levers 6, which are fulcrumed on transverse rods 7. The rods 7 are mounted in openings formed in the channel bars $1^a$. The hubs of the disks 4 may be held against the inner faces of the levers 6 by cotter pins 8. The opposite ends of each shaft 5 are suitably secured to the adjacent levers so that the operation of one about its fulcrum 7 will operate the other lever and thus serve to move both disks 4 together. The lower or free ends of the levers at one side are connected together by a bar 9, each lever 6 being pivotally connected thereto by a bolt 10 or other device, so that the movement of the bar endwise will simultaneously swing all of the levers and thus raise or lower the disks 4 together as a unit. The bar 9, at one end, is pivotally connected to a nut 11 with which is connected a threaded shaft 12. The shaft 12 is mounted in a suitable bearing provided in a bracket 13 and has secured to it a hand wheel 14 by which the shaft 12 is rotated. The bearing for the shaft 12 is constructed to permit swinging movement of the shaft 12, whereby it may accommodate itself to the position of the nut 11 due to movement thereof in swinging the levers 6 about their fulcrums.

15 indicates a pair of vertical plates supported in spaced relation between the bars $1^a$ by angles 16 and forming a support for a pair of shafts 17, $17^a$, preferably disposed in vertical alignment and equal distances from the axis of the boiler A, since it is customary (but not a necessity) to mount the bushings C equal and predetermined distances from the axis of the boiler even though the latter may vary in diameter. 18, $18^a$, indicate suitable bearings for the shafts 17, $17^a$, mounted in the plates 15, the bearings $18^a$ having shoulders 18' which bear against the inner plate 15 to take any end thrust resulting from the operation of positioning the elements D. The inner ends of the shafts 17, $17^a$ are provided with threads to fit within threaded openings in the main portion 19 of the socket members 3 (see Fig. 10).

Figure 10:
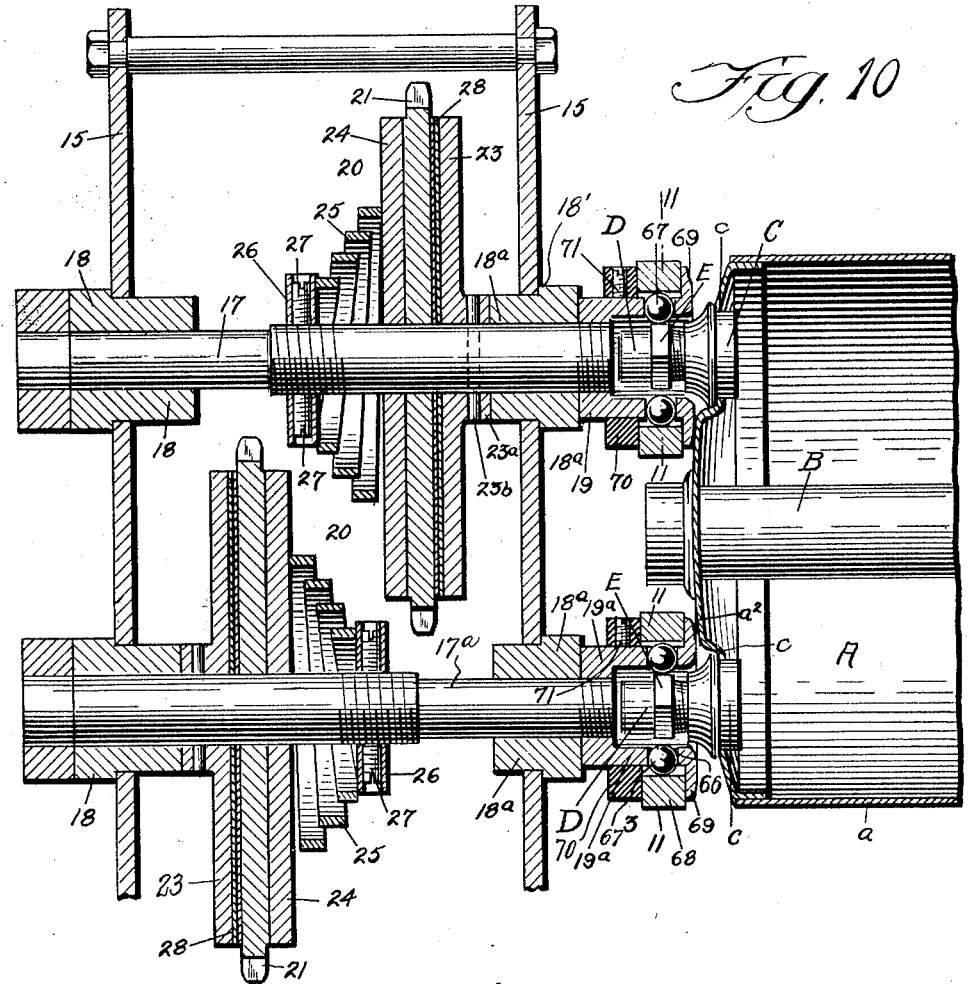
Fig. 10 is a section on the line 10—10 of Fig. 2.
Figure 11:
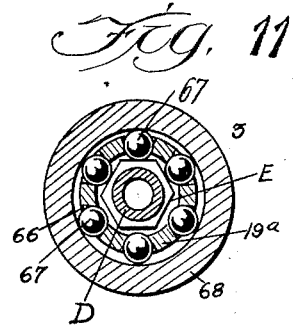
Fig. 11 is a section on the line 11—11 of Fig. 10.

20 indicates as an entirety a driving means for each shaft 17, $17^a$. Of these means, 21 indicates a driven element loosely fitting the adjacent shaft, whereby it is free to rotate and slide thereon. This driven element preferably consists of a sprocket that is engaged and driven by a suitable chain 22. 23 indicates a disk arranged to engage one face of the sprocket 21, the friction therebetween serving to transmit power from the sprocket to the disk. The hub $23^a$ of the disk is connected to the shaft by a pin $23^b$, whereby the adjacent shaft 17 or $17^a$ is driven. 24 indicates a disk engaging the opposite face of the sprocket 21 and normally pressed thereagainst by a spring 25, whereby frictional engagement is maintained between the sprocket 21 and disk 23. The disk 24 may be freely mounted on the shaft to rotate and slide relative thereto. The spring 25 is preferably in the form of a helix and abuts at one end the disk 24 and at its opposite end a collar 26. The collar 26 has screw threaded connection with the adjacent shaft 17 or $17^a$, whereby it may be adjusted to increase or decrease the tension of the spring 25, and it may be locked or set in its adjusted position by one or more screws 27 threaded into openings formed in the collar. The friction clutch surfaces between the sprocket 21 and disk 23 may be provided with suitable friction increasing material, indicated at 28. The driving means 20 for each of the shafts 17, $17^a$, are similar in construction, but the elements of one are reversed relative to those of the other, so that they will occupy less space. When the boiler A is positioned on the bed 2, as shown in Figs. 1 and 10, with the socket members 3, 3, enveloping and engaging the elements D, and the shafts 17, $17^a$, are driven, these elements D will be screwed down and tightened into final position in the bushings C or until the resistance due to tightening overcomes the friction between the sprockets and the adjacent clutch disks, whereupon the sprockets will slip relative to the disk. The springs 25 are adjusted to maintain the friction clutch surfaces in yieldable engagement with sufficient pressure to insure the final positioning of the elements D in the bushings C. The driving mechanism for the sprockets 21 will be later referred to.

Figure 8:
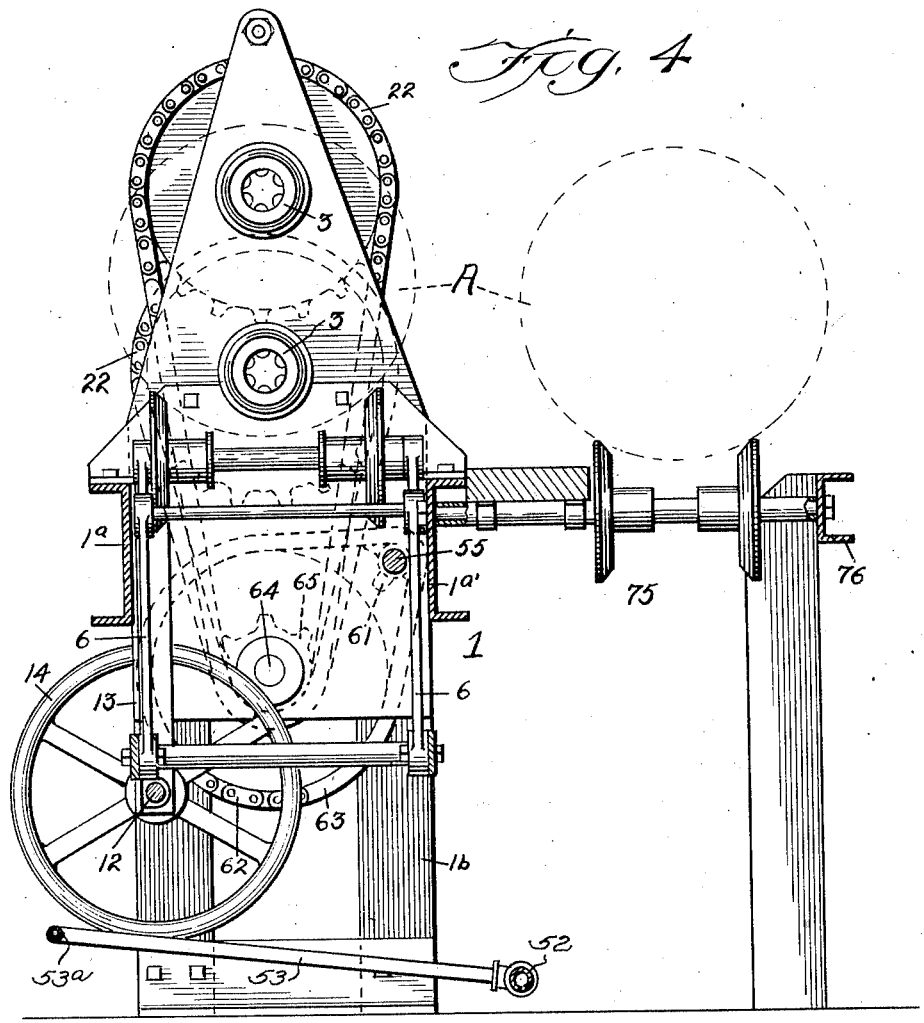
Fig. 8 is a section on the line 8—8 of Fig. 7.
Figure 9:
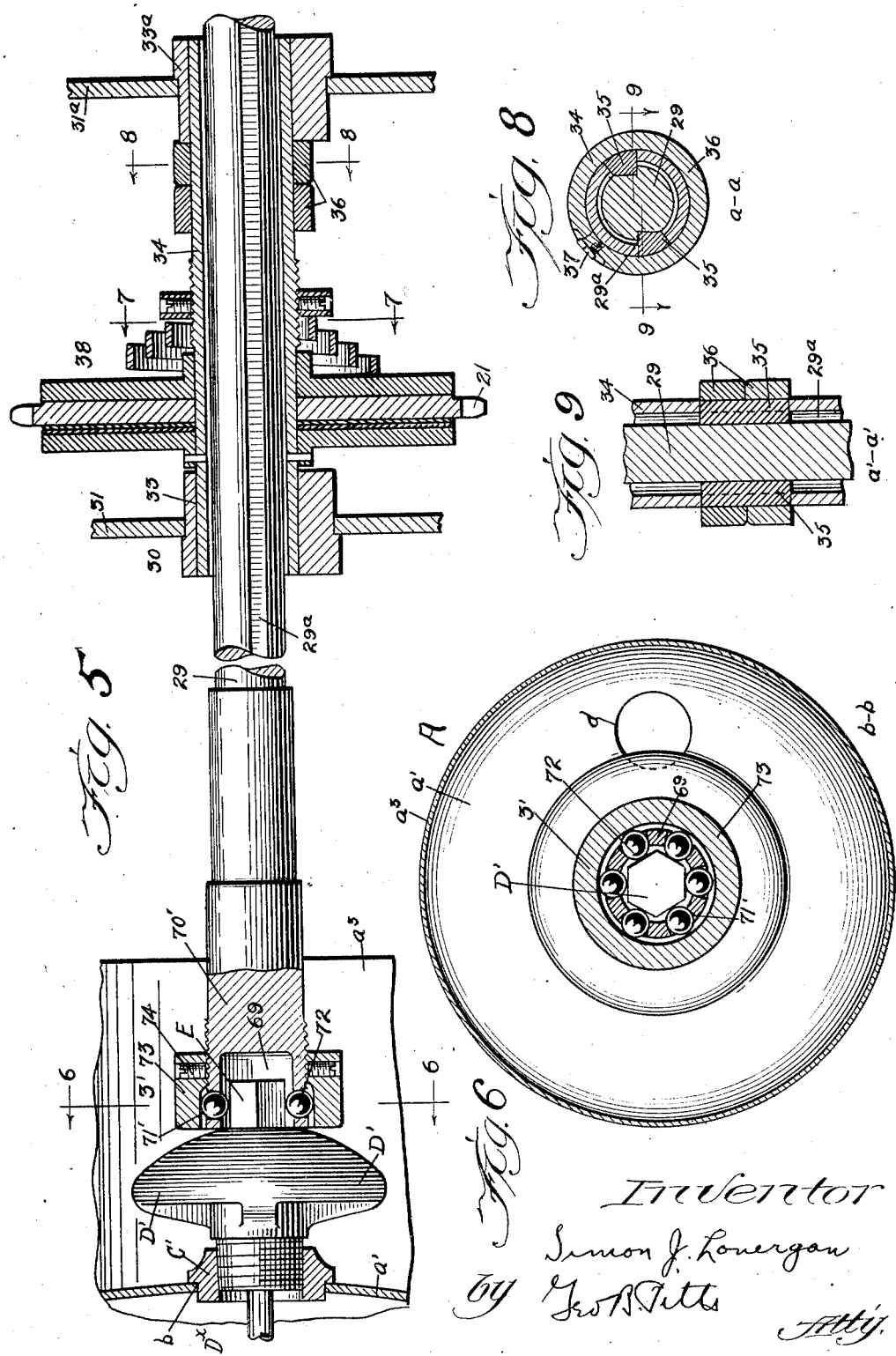
Fig. 9 is a section on the line 9—9 of Fig. 8.

29 indicates a shaft slidably and adjustably mounted in a mounting, indicated as an entirety at 30, and carrying at its inner end the socket member 3' adapted to envelope and engage the irregular portion E of the element D' for positioning the latter in the bushing C' on the wall $a'$ of the boiler A. The mounting 30 comprises a pair of spaced vertical plates 31, 31ᵃ, supported on and secured to the bars 1ᵃ by angles 32, eccentrics 33, 33ᵃ, rotatably mounted in aligned openings formed in the plates 31, 31ᵃ, and a sleeve shaft 34 rotatable in the eccentrics 33, 33ᵃ. The shaft 29 is slidable endwise in the sleeve shaft 34, but is keyed thereto by the keys 35, so that the shaft 29 will be rotated by the shaft 34. The keys 35 project through openings formed in the sleeve shaft 34 into the splines 29ᵃ, the keys being held in position by rings 36 which are connected to the shaft 34 by screws or bolts 37 (see Fig. 8). The shaft 29 has a relatively loose fit within the sleeve shaft 34, thereby permitting the shaft 29 to be readily operated endwise to move the socket member 3' carried at its inner end into and out of operative position as well as to permit a slight swinging movement of the shaft in order that the socket member may accommodate itself to slight irregularities in the position or location of the element D' to be engaged.

38 indicates means for driving the sleeve shaft 34. The driving means 38 are preferably similar in construction to the driving means 20, for which reason it will not be necessary to describe them.

As shown in Figs. 1 and 2, the shaft 29 is relatively long partly to enable it to co-operate with the shafts 17, 17ᵃ, to operate upon boilers of different sizes and partly to enable it to be retracted far enough to clear the open end of the boiler skirt $a^3$.

Where heating elements D' are to be applied to a different size of boiler, or where the bushings C' are positioned to one side of the axis of the boiler A, the shafts 29 and 34 are adjusted vertically, by rotation of the eccentrics 33, 33ᵃ, to position the socket 3' in the desired position. For this purpose, an arm 39 is rigidly secured to and extends outwardly from each eccentric, and at their outer ends, these arms 39 are connected together by a rod 40 which serves as a handle for operating the eccentrics. As shown in Fig. 1, the handle 40 extends horizontally within easy reach of the operative. Any suitable means may be provided for securing the eccentrics 33, 33ᵃ, or their operating elements 39, 39, 40, in adjusted position. As illustrative of one form of securing means, I provide a screw 39', fitting a threaded opening in one of the arms 39 and adapted, when turned or rotated in one direction, to engage the adjacent supporting plate 31ᵃ, as shown in Figs. 1 and 2.

45 indicates a motor (preferably of the electric type) mounted on a base 46. The shaft of the motor carries a pulley 47 for a belt 48, which engages and drives a large pulley 49. The belt 48 loosely surrounds the pulley 47, so that under normal conditions it may slip thereon, but by the action of an idler take-up pulley 50 engaging one run of the belt 48, it may be tightened relative to the pulley 47 and thus permit the latter to drive the pulley 49. The pulley 50 is loosely mounted on a shaft 50ᵃ, the latter being mounted on an arm 51, which is fixed to a rod or shaft 52, trunnioned at its opposite ends in openings formed in cross members 1ᶜ. The rod 52 is provided with arms 53 connected at their outer ends by a bar 53ᵃ, which constitutes a foot pedal, whereby the operative can conveniently operate the arm 51 to effect engagement of the take-up or tightening pulley 50 with the belt 48. The pulley 50 is normally held out of engagement with the belt 48 by a spring 54, preferably connected at one end to the frame 1 and at its opposite end to the bar 53ᵃ. By preference, the arm 51 carries a bracket 51ᵃ on which is supported a shoe 51' arranged to engage the inner surface of the pulley rim and effect a braking acting thereon. Due to the arrangement of these elements, as shown in Fig. 3, the brake shoe is released when the pulley 50 is moved into engagement with the belt 48 and applied when the pulley 50 disengages the belt. The pulley 49 is secured to a shaft 55 which extends longitudinally of the frame 1, being mounted in suitable bearings in the uprights 1ᵇ. Near one end the shaft 55 carries a spur pinion 56. The pinion 56 meshes with a gear 57 fixed to a counter-shaft 58, which is mounted in bearings 58ᵃ, carried by the depending sections of the plates 31, 31ᵃ. The shaft 58 carries a sprocket 60 around which and the sprocket 21 of the driving means 38 runs a suitable chain 38ᵃ to operate said means. Near its opposite end, the shaft 55 carries a sprocket 61 (Fig. 4), which, by means of a chain 62, drives a sprocket 63 fixed to a shaft 64. The shaft 64 in turn carries sprockets 65, around which the chains 22 for the sprockets 21 of the driving means 20 run and from which these latter sprockets are driven. The ratio between the respective power elements for the driving means 20, 20 and 38 are preferably the same, so that the shafts 17, 17ᵃ and 29 may be driven at substantially the same speed.

Each of the socket members 3 for engaging and rotating the elements D mounted on the upper end wall $a^2$ comprises a hollowed out body having a main portion or bottom 19 (already referred to) and annular side walls 19ᵃ formed with a series of openings 66 to receive balls 67, a ball race 68 surrounding the wall 19ᵃ and a flange 69. The flange 69 serves as a seat for the race 68—being held thereagainst by a collar 70 fixed to the wall 19ᵃ by a set screw 71— and as a bearing member or abutment to engage the top wall $a^2$ as it rotates. The recesses or openings 66 correspond in number to the number of angular sides provided on the irregular body portion E of the element D, so that the balls 67 may engage therewith and through their co-operation rotate such element to effect its positioning in the adjacent bushing C. The side walls of the openings 66 are shaped to prevent the balls from falling out therefrom.

The socket member 3' comprises a recess 69 formed in the outer end of a shank 70', which in turn is secured at its inner end to the outer end of the shaft 29. The side wall of the recess 69 is formed with a plurality of openings 71' to receive balls 72. 73 indicates a collar surrounding the side wall of the recess 69 and forming a suitable race for the balls 72. The inner end of the collar 73 has screw threaded connection with the shank 70' whereby it may be adjusted as well as positioned to permit assembly and disassembly of the balls 72; being locked in adjusted position by one or more set screws 74.

As will be understood from Fig. 6, the balls 72 are arranged to engage the angular faces of the body portion E of the device or element D', the number of balls being equal to the number of faces provided on the body portion, and co-operate to form a connection between the socket member 3' and device D' to effect a rotation of the latter when the shaft 29 is driven. By providing a series of balls to engage the body portion E of each element, a number of advantages are attained; for example: the balls being loose in their retaining openings, they are, within certain limits, free to move outwardly and inwardly and substantially circumferentially and hence accommodate themselves to any disalignment that may occur in the location of the elements D, D', or the construction of their walls or the angular relation that the faces E may have as the elements are moved into the sockets 3, 3'; also, they act, without causing friction, to guide the body portion E of the element into the socket within and in active relation to the balls.

75 indicates a conveyor extending from a source of supply or warehouse for the containers A and leading to a position at one side of the frame 1. That portion of the conveyor 75 adjacent the frame 1 is preferably incorporated therewith to simplify the construction by mounting a separate channel 76 in spaced relation to the channel 1ª' and supporting it on legs 77. The conveying elements preferably comprise aligned rolls or disks 78 loosely mounted on shafts 79 which are suitably supported by the channels 1ª', 76.

In operation, the containers or boilers A, having the elements D, D', loosely engaging the bushings C, C', are fed endwise successively by the conveyor each to a position at one side of the bed 2. The container that is in this latter position is manually rolled off the conveyor 76, across an intermediate support 80 onto the bed 2, which has been previously adjusted by the hand wheel 14 to the desired position according to the size of the boiler to be operated upon.

The boiler A is then adjusted angularly on the bed 2 to align the couplings C, C, and elements D, D', thereon with the socket members 3 and following this, it is moved endwise to project these parts into the members 3 (see Fig. 10). Next, the shaft 29 (which has been previously adjusted) is moved endwise from the position shown in Fig. 2 to the position shown in Figs. 1 and 5, thereby causing the socket member 3' to engage the element D'. Next, the pedal 53ª is pressed downwardly which operation effects a transmission of power from the motor 45, through the pulley 49, shaft 55, counter-shafts 58 and 64 to the driving means 20, 21 and 38. As a result, the socket members 3, 3', will be simultaneously driven and in turn screw the elements D, D', into final position. When tightened sufficient to effect slippage between the clutch faces 28, the operative may release the pedal and stop the shafts 17, 17ª, 29. Following the stopping of these shafts, the shaft 29 is moved endwise in the opposite direction to the position shown in Fig. 2, which is beyond the end of the skirt aª and then the boiler A is removed from the bed 2 and another positioned thereon in the manner already set forth.

By means of the pinion 56 and gear 57, the shaft 58 is driven oppositely to the shaft 64, in order that the elements D and D' may be rotated in the proper directions from a single driving source.

From the foregoing description it will be seen that my machine is relatively simply and easily operated and permits one or more elements to be put on one end of a container or elements to be put on both ends simultaneously. When one or more elements are put on the top wall a², the shaft 29 is operated to bring its outer end or the socket member 3' into or substantially into engagement with the bottom wall a', thereby tending to prevent any thrust of the boiler away from the socket members 3.

It will also be noted from the foregoing description that I provide two adjustments one for the bed on which the container A rests and another for the shaft 29. By arranging the bushings C at predetermined distances from each other for containers of different sizes, the adjustment of the bed will enable any size container to be operated upon by the sockets 3, 3; whereas by the provision of an adjustment for the shaft 34 the shaft 29 may be brought into alignment with elements D', whether disposed axially of the body A or at one side of its axis. Furthermore, by reason of the latter adjustment, it is not necessary for the bushings C, C, to be in diametrical relation. Accordingly it will be seen that my machine adapts itself to different sizes of containers and also different positions of the elements relative to the axis thereof.

To those skilled in the art to which my invention relates many changes in construction and widely differing embodiments and applications of the invention will suggest themselves without departing from the spirit and scope thereof. My disclosures and the description herein are purely illustrative and are not intended to be in any sense limiting.

What I claim is:

1. In mechanism of the class described, the combination of a support for a body, a device rotatably mounted thereon and arranged to engage an element to be positioned on the body, said device comprising a hollow member having balls uniformly spaced around its side wall and serving as interlocking means to engage and rotate the element, and means for rotating said device.

2. A mechanism as claimed in claim 1 in which the device is provided with retaining means arranged to permit independent movement of the balls relative to each other.

3. In mechanism of the class described, the combination of a support for a body, a device rotatably mounted thereon and arranged to engage an element to be positioned on the body, a flange arranged to revolve on the wall of the body and maintain the device and body in operative relationship.

4. A mechanism as claimed in claim 1 in which that portion of the support on which the body rests comprises a series of pairs of rolls mounted on transversely arranged axes.

5. In mechanism of the class described, the combination of a support having a bed arranged to receive and hold a body, a device rotatably mounted on said support and arranged to engage an element to be positioned on the body and interlock therewith, said bed comprising a plurality of shafts carrying rolls with which the body engages, levers for supporting said shafts and means for operating said levers to adjust the rolls relative to said device, and means for rotating said device.

6. In mechanism of the class described, the combination of a support having a bed for a body, devices rotatably mounted on said support and arranged to engage elements on different walls of said body and interlock therewith, one of said devices being movable relative to the adjacent wall of the body to permit positioning of the latter on said bed, and means for rotating said devices.

7. A mechanism as claimed in claim 6 in which said devices are opposed and engage the elements on opposite walls of the body.

8. In mechanism of the class described, the combination of a support having a bed to hold a body, a shaft on said support in eccentric relation to the axis of the body and carrying socket arranged to envelope an element on one wall of the body and interlock therewith, a separate shaft on said support carrying a socket arranged to envelope an element on the opposite wall of the body and interlock therewith, one of said shafts being movable into and out of operating position, and means for rotating said shafts.

9. In mechanism of the class described, the combination of a support having a bed to hold a body, a shaft on said support in eccentric relation to the axis of the body and carrying a socket arranged to envelope an element on one wall of the body and interlock therewith, a separate shaft on said support carrying a socket arranged to envelope an element on the opposite wall of the body and interlock therewith, one of said shafts being movable into and out of operating position, means for rotating said shafts, and eccentrically operated means for adjusting the last mentioned shaft.

10. In mechanism of the class described, the combination of a support for a body, a device rotatably mounted thereon and arranged to engage an element to be positioned on said body, said device comprising a hollow member having relatively movable elements uniformly spaced around its side wall and serving as a means for guiding the element on the body into said device and for interlocking the device with the element, whereby the latter is operated, and means for rotating said device.

11. In mechanism of the class described, the combination of a support for a body, devices rotatably mounted on said support and arranged to removably engage elements on one or more walls of the body and interlock therewith, one of said devices being movable relative to the adjacent body wall to permit positioning of the body on said support, and friction driving means for each of said devices.

In testimony whereof, I have hereunto subscribed my name.

SIMON J. LONERGAN.